United States Patent
Gupta et al.

(10) Patent No.: US 10,999,168 B1
(45) Date of Patent: May 4, 2021

(54) USER DEFINED CUSTOM METRICS

(71) Applicant: Vmware, Inc., Palo Alto, CA (US)

(72) Inventors: Ashutosh Gupta, San Jose, CA (US); Gaurav Rastogi, San Francisco, CA (US); Abhijeet Joglekar, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/993,443

(22) Filed: May 30, 2018

(51) Int. Cl.
*H04L 12/26* (2006.01)
*H04L 29/06* (2006.01)
*H04L 12/935* (2013.01)

(52) U.S. Cl.
CPC .......... *H04L 43/045* (2013.01); *H04L 43/08* (2013.01); *H04L 49/3063* (2013.01); *H04L 69/22* (2013.01)

(58) Field of Classification Search
CPC ....... H04L 43/045; H04L 43/08; H04L 69/22; H04L 49/3063
See application file for complete search history.

(56) References Cited

U.S. PATENT DOCUMENTS

| | | | |
|---|---|---|---|
| 5,109,486 A | 4/1992 | Seymour | |
| 5,781,703 A | 7/1998 | Desai et al. | |
| 6,148,335 A | 11/2000 | Haggard et al. | |
| 6,449,739 B1 | 9/2002 | Landan | |
| 6,515,968 B1 | 2/2003 | Combar et al. | |
| 6,714,979 B1 | 3/2004 | Brandt et al. | |
| 6,792,458 B1 | 9/2004 | Muret et al. | |
| 6,792,460 B2 | 9/2004 | Oulu et al. | |
| 6,901,051 B1 | 5/2005 | Hou et al. | |
| 6,996,778 B2 | 2/2006 | Rajarajan et al. | |
| 7,076,695 B2 | 7/2006 | McGee et al. | |
| 7,130,812 B1 | 10/2006 | Iyer et al. | |
| 7,246,159 B2 | 7/2007 | Aggarwal et al. | |
| 7,353,272 B2 | 4/2008 | Robertson et al. | |
| 7,430,610 B2 | 9/2008 | Pace et al. | |
| 7,636,708 B2 | 12/2009 | Garcea et al. | |
| 7,701,852 B1 | 4/2010 | Hohn et al. | |
| 7,933,988 B2 | 4/2011 | Nasuto et al. | |
| 7,990,847 B1 * | 8/2011 | Leroy ................. | H04L 43/0817 370/216 |

(Continued)

FOREIGN PATENT DOCUMENTS

WO    2020086956 A1    4/2020

OTHER PUBLICATIONS

Author Unknown, "Autoscaler," Compute Engine—Google Cloud Platform, Jun. 29, 2015, 6 pages, retrieved at http://web.archive.org/web/20150629041026/https://cloud.google.com/compute/docs/autoscaler/.

(Continued)

*Primary Examiner* — Un C Cho
*Assistant Examiner* — Yu-Wen Chang
(74) *Attorney, Agent, or Firm* — Adeli LLP

(57) ABSTRACT

A custom metrics technique includes: accessing a packet; processing the packet using a packet processing pipeline of a service engine in a distributed network service platform, including: reaching a pre-specified point in the packet processing pipeline; inserting, in the packet processing pipeline, script code that corresponds to the pre-specified point; executing the script code to collect at least metric-related data associated with a user-specified metric object; and executing remaining packet processing pipeline.

20 Claims, 7 Drawing Sheets

(56) References Cited

U.S. PATENT DOCUMENTS

| | | | |
|---|---|---|---|
| 8,032,896 B1 | 10/2011 | Li et al. | |
| 8,112,471 B2 | 2/2012 | Wei et al. | |
| 8,588,069 B2 | 11/2013 | Todd et al. | |
| 8,856,797 B1 | 10/2014 | Siddiqui et al. | |
| 8,874,725 B1 | 10/2014 | Ganjam et al. | |
| 9,032,078 B2 | 5/2015 | Beerse et al. | |
| 9,210,056 B1 | 12/2015 | Choudhary et al. | |
| 9,288,193 B1 | 3/2016 | Gryb et al. | |
| 9,300,552 B2 | 3/2016 | Dube et al. | |
| 9,459,980 B1 | 10/2016 | Arguelles | |
| 9,467,476 B1 | 10/2016 | Shieh et al. | |
| 9,477,784 B1 | 10/2016 | Bhave et al. | |
| 9,483,286 B2 | 11/2016 | Basavaiah | |
| 9,495,222 B1 | 11/2016 | Jackson | |
| 9,531,614 B1 | 12/2016 | Nataraj et al. | |
| 9,558,465 B1 | 1/2017 | Arguelles et al. | |
| 9,571,516 B1 | 2/2017 | Curcic et al. | |
| 9,608,880 B1 | 3/2017 | Goodall | |
| 9,613,120 B1 | 4/2017 | Kharatishvili et al. | |
| 9,626,275 B1 | 4/2017 | Hitchcock et al. | |
| 9,674,302 B1 | 6/2017 | Khalid et al. | |
| 9,680,699 B2 | 6/2017 | Cohen et al. | |
| 9,692,811 B1 | 6/2017 | Tajuddin et al. | |
| 9,697,316 B1 | 7/2017 | Taylor et al. | |
| 9,712,410 B1* | 7/2017 | Char | H04L 43/08 |
| 9,716,617 B1 | 7/2017 | Ahuja et al. | |
| 9,729,414 B1 | 8/2017 | Oliveira et al. | |
| 9,749,888 B1 | 8/2017 | Colwell et al. | |
| 9,830,192 B1 | 11/2017 | Crouchman et al. | |
| 9,935,829 B1 | 4/2018 | Miller et al. | |
| 10,003,550 B1 | 6/2018 | Babcock et al. | |
| 10,212,041 B1 | 2/2019 | Rastogi et al. | |
| 10,313,211 B1 | 6/2019 | Rastogi et al. | |
| 10,372,600 B2 | 8/2019 | Mathur | |
| 10,547,521 B1 | 1/2020 | Roy et al. | |
| 10,594,562 B1 | 3/2020 | Rastogi et al. | |
| 10,693,734 B2 | 6/2020 | Rastogi et al. | |
| 10,728,121 B1 | 7/2020 | Chitalia et al. | |
| 10,873,541 B2 | 12/2020 | Callau et al. | |
| 2002/0078150 A1 | 6/2002 | Thompson et al. | |
| 2002/0198984 A1 | 12/2002 | Goldstein et al. | |
| 2002/0198985 A1 | 12/2002 | Fraenkel et al. | |
| 2003/0191837 A1 | 10/2003 | Chen | |
| 2003/0236877 A1* | 12/2003 | Allan | G06Q 30/06 709/224 |
| 2004/0054680 A1 | 3/2004 | Kelley et al. | |
| 2004/0064552 A1 | 4/2004 | Chong et al. | |
| 2004/0103186 A1* | 5/2004 | Casati | H04L 41/18 709/224 |
| 2004/0243607 A1 | 12/2004 | Tummalapalli | |
| 2005/0010578 A1 | 1/2005 | Doshi | |
| 2005/0060574 A1 | 3/2005 | Klotz et al. | |
| 2005/0108444 A1 | 5/2005 | Flauaus et al. | |
| 2005/0120160 A1 | 6/2005 | Plouffe et al. | |
| 2005/0172018 A1 | 8/2005 | Devine et al. | |
| 2005/0188221 A1 | 8/2005 | Motsinger et al. | |
| 2006/0167939 A1 | 7/2006 | Seidman et al. | |
| 2006/0242282 A1 | 10/2006 | Mullarkey | |
| 2006/0271677 A1 | 11/2006 | Mercier | |
| 2007/0226554 A1 | 9/2007 | Greaves et al. | |
| 2008/0104230 A1 | 5/2008 | Nasuto et al. | |
| 2008/0126534 A1 | 5/2008 | Mueller et al. | |
| 2009/0154366 A1 | 6/2009 | Rossi | |
| 2009/0199196 A1 | 8/2009 | Peracha | |
| 2010/0279622 A1 | 11/2010 | Shuman et al. | |
| 2011/0126111 A1 | 5/2011 | Gill et al. | |
| 2011/0196890 A1* | 8/2011 | Pfeifle | G06F 16/29 707/769 |
| 2012/0101800 A1 | 4/2012 | Miao et al. | |
| 2012/0110185 A1* | 5/2012 | Ganesan | G06F 9/5072 709/226 |
| 2012/0254443 A1 | 10/2012 | Ueda | |
| 2013/0013953 A1 | 1/2013 | Eck et al. | |
| 2013/0086230 A1 | 4/2013 | Guerra et al. | |
| 2013/0086273 A1 | 4/2013 | Wray et al. | |
| 2013/0179289 A1 | 7/2013 | Calder et al. | |
| 2013/0179881 A1 | 7/2013 | Calder et al. | |
| 2013/0179894 A1 | 7/2013 | Calder et al. | |
| 2013/0179895 A1 | 7/2013 | Calder et al. | |
| 2013/0211559 A1 | 8/2013 | Lawson et al. | |
| 2013/0212257 A1 | 8/2013 | Murase et al. | |
| 2013/0343213 A1 | 12/2013 | Reynolds et al. | |
| 2013/0346594 A1 | 12/2013 | Banerjee et al. | |
| 2014/0006862 A1 | 1/2014 | Jain et al. | |
| 2014/0143406 A1 | 5/2014 | Malhotra et al. | |
| 2014/0173675 A1 | 6/2014 | Ahmed et al. | |
| 2014/0215058 A1 | 7/2014 | Vicat-Blanc et al. | |
| 2014/0215621 A1 | 7/2014 | Xaypanya et al. | |
| 2014/0229706 A1* | 8/2014 | Kuesel | G06F 15/76 712/31 |
| 2014/0282160 A1 | 9/2014 | Zarpas | |
| 2014/0304414 A1 | 10/2014 | Yengalasetti et al. | |
| 2014/0344439 A1 | 11/2014 | Kempf et al. | |
| 2015/0058265 A1 | 2/2015 | Padala et al. | |
| 2015/0074679 A1 | 3/2015 | Fenoglio et al. | |
| 2015/0081880 A1 | 3/2015 | Eaton et al. | |
| 2015/0124640 A1 | 5/2015 | Chu et al. | |
| 2015/0199219 A1 | 7/2015 | Kim et al. | |
| 2015/0212829 A1 | 7/2015 | Kupershtok et al. | |
| 2015/0288682 A1 | 10/2015 | Bisroev et al. | |
| 2015/0293954 A1 | 10/2015 | Hsiao et al. | |
| 2015/0295780 A1 | 10/2015 | Hsiao et al. | |
| 2015/0295796 A1 | 10/2015 | Hsiao et al. | |
| 2015/0358391 A1 | 12/2015 | Moon et al. | |
| 2015/0370852 A1 | 12/2015 | Shastry et al. | |
| 2016/0064277 A1 | 3/2016 | Park et al. | |
| 2016/0094431 A1 | 3/2016 | Hall et al. | |
| 2016/0094483 A1 | 3/2016 | Johnston et al. | |
| 2016/0105335 A1 | 4/2016 | Choudhary et al. | |
| 2016/0127204 A1 | 5/2016 | Ozaki et al. | |
| 2016/0164738 A1 | 6/2016 | Pinski et al. | |
| 2016/0182399 A1 | 6/2016 | Zadka et al. | |
| 2016/0217022 A1 | 7/2016 | Velipasaoglu et al. | |
| 2016/0294722 A1 | 10/2016 | Bhatia et al. | |
| 2016/0323377 A1 | 11/2016 | Einkauf et al. | |
| 2017/0041386 A1 | 2/2017 | Bhat et al. | |
| 2017/0063933 A1 | 3/2017 | Shieh et al. | |
| 2017/0093986 A1* | 3/2017 | Kim | H04L 49/00 |
| 2017/0134481 A1 | 5/2017 | DeCusatis et al. | |
| 2017/0331907 A1 | 11/2017 | Jagannath et al. | |
| 2018/0004582 A1* | 1/2018 | Hallenstål | H04L 67/10 |
| 2018/0018244 A1 | 1/2018 | Yoshimura et al. | |
| 2018/0041408 A1 | 2/2018 | Dagum et al. | |
| 2018/0041470 A1* | 2/2018 | Schultz | H04L 47/24 |
| 2018/0046482 A1 | 2/2018 | Karve et al. | |
| 2018/0088935 A1 | 3/2018 | Church et al. | |
| 2018/0089328 A1* | 3/2018 | Bath | G06F 3/0481 |
| 2018/0136931 A1 | 5/2018 | Hendrich et al. | |
| 2018/0287902 A1 | 10/2018 | Chitalia et al. | |
| 2018/0309637 A1* | 10/2018 | Gill | H04L 67/36 |
| 2018/0335946 A1 | 11/2018 | Wu et al. | |
| 2019/0123970 A1 | 4/2019 | Rastogi et al. | |
| 2020/0136939 A1 | 4/2020 | Rastogi et al. | |
| 2020/0136942 A1 | 4/2020 | Rastogi et al. | |
| 2020/0169479 A1 | 5/2020 | Ireland | |
| 2020/0287794 A1 | 9/2020 | Rastogi et al. | |

OTHER PUBLICATIONS

Author Unknown, "Autoscaling," Aug. 20, 2015, 4 pages, Amazon Web Services, retrieved from http://web.archive.org/web/20150820193921/https://aws.amazon.com/autoscaling/.

Catania, V., et al., "PMT: A Tool to Monitor Performances in Distributed Systems," Proceedings of the 3rd IEEE International Symposium on High Performance Distributed Computing, Aug. 2-5, 1994, 8 pages, San Francisco, CA, USA.

Davis, David, "Post #8—Understanding vCenter Operations Badges," David Davis Blog, Apr. 29, 2014, 5 pages, retrieved from http://blogs.vmware.com/management/2014/04/david-davis-on-vcenter-operations-post-8-understanding-vcenter-operations-badges.html.

De George, Andy, "How to Scale an Application," Jun. 16, 2015, 8 pages, Github.com.

(56) References Cited

OTHER PUBLICATIONS

Liu, Feng, et al., "Monitoring of Grid Performance Based-on Agent," 2007 2nd International Conference on Pervasive Computing and Applications, Jul. 26-27, 2007, 6 pages, IEEE, Birmingham, UK.

Non-Published commonly Owned U.S. Appl. No. 15/130,499, filed Apr. 15, 2016, 49 pages, Avi Networks.

Non-Published commonly Owned U.S. Appl. No. 15/453,258, filed Mar. 8, 2017, 34 pages, Avi Networks.

Sevcik, Peter, et al., "Apdex Alliance," May 24, 2014, 5 pages, www.apdex.org.

Wallace, Paul, et al., "Feature Brief: Stingray's Autoscaling Capability," Brocade Community Forums, May 1, 2013, 5 pages, retrieved from http://community.brocade.com/t5/vADC-Docs/Feature-Brief-Stingray-s-Autoscaling-capability/ta-p/73843.

Yar, Mohammed, et al., "Prediction Intervals for the Holt-Winters Forecasting Procedure," International Journal of Forecasting, Month Unknown 1990, 11 pages, vol. 6, Issue 1, Elsevier Science Publishers B.V.

Zhang, Xuehai, et al., "A Performance Study of Monitoring and Information Services for Distributed Systems," Proceedings of the 12th IEEE International Symposium on High Performance Distributed Computing, Jun. 22-24, 2003, 12 pages, IEEE Computer Society, Washington, D.C., USA.

Author Unknown, "BPF, eBPF, XDP and Bpfilter . . . What are These Things and What do They Mean for the Enterprise?," Apr. 16, 2018, 11 pages, Netronome, retrieved from https://www.netronome.com/blog/bpf-ebpf-xdp-and-bpfilter-what-are-these-things-and-what-do-they-mean-enterprise/.

Non-Published commonly owned U.S. Appl. No. 15/055,450, filed Feb. 26, 2016, 37 pages, VMware, Inc.

Non-Published commonly Owned U.S. Appl. No. 16/905,571, filed Jun. 18, 2020, 40 pages, VMware, Inc.

* cited by examiner

```
{
    "count": 1,                                                          ┌─────┬────────┐
    "results": [                                                         │ Raw │ Parsed │
        {                                                                └─────┴────────┘
            "series": [
                {
                    "header": {
                        "statistics": {
                            "min": 63.5,
                            "trend": 0.069,
                            "max": 72.8833333333333,
                            "max_ts": "2017-05-16T19:55:00+00:00",
                            "min_ts": "2017-05-16T19:50:00+00:00",
                            "num_samples": 2,
                            "mean": 68.192
                        },
                        "metrics_min_scale": 100,
                        "metric_description": "Time averaged value of counter over given
                        period. For example, fetch counter 'foo' via API
                        /api/analytics/metrics/virtualservice/?
                        metric_id=user_metrics.avg_counter&limit=1&step=300&obj_id=foo.",
                        "obj_id": "user-metric2",
                        "metrics_sum_agg_invalid": false,
                        "server": "user-metric2",
                        "priority": true,
                        "entity_uuid": "virualservice-c58242ca-1a39-40de-8200-
                        25b64f6807c0",
                        "units": "METRIC_COUNT",
                        "obj_id_type": "METRICS_OBJ_ID_TYPE_VIRTUALSERVICE",
                        "tenant_uuid": "admin",
                        "name": "user_metrics.avg_counter"
                    },
                    "data": [
                        {
                            "timestamp": "2017-05-16T19:50:00+00:00",
                            "value": 63.5
                        },
                        {
                            "timestamp": "2017-05-16T19:50:00+00:00",
                            "value": 72.8833333333333
                        }
                    ]
                }
            ],
            "entity_uuid": "virtualservice-c58242ca-1a39-40de-8200-25b64f6807c0"
        }
    ]
}
```

USER DEFINED CUSTOM METRICS

BACKGROUND OF THE INVENTION

Modern networking equipment typically has the capabilities to monitor network traffic and collect metrics on traffic data. For example, routers, switches, load balancers, etc. often have certain built-in counters for collecting in-line traffic as data arrives at or exists from the networking equipment. Typically, the built-in counters such as number of packets received are predefined on the system. In practice, operators frequently want to specify their own counters to collect specific types of data, such as number of connections originating from a certain country, number of connections destined for a specific address, average number of packets received per hour, etc. To configure such counters, additional logic is required on the part of the equipment. Specifically, additional code needs to be added to the software (usually by the third-party equipment maker) to compute the desired metrics. The new code is recompiled, tested, and reinstalled on the equipment. Such a process, however, is cumbersome, inflexible, and expensive to implement. It can also be difficult to implement such a process on a distributed system where multiple devices can collect the same type of data.

Another approach is to collect raw data and provide the collected data to the equipment maker for off-line analysis. This approach, however, is often infeasible because the operators may not wish to expose sensitive network data to a third-party. Furthermore, because the analysis would be restricted to off-line use, the results cannot be easily applied to real-time data and affect desired changes on the network in response.

It is therefore desirable to have a more flexible technique to provide desired metrics data to operators. It is also useful for the technique to be able to provide metrics data for in-line traffic and for distributed systems.

BRIEF DESCRIPTION OF THE DRAWINGS

Various embodiments of the invention are disclosed in the following detailed description and the accompanying drawings.

FIG. 6 illustrates an example response from the controller which returns the values of an average for two time periods.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing user-specified custom metrics in a distributed networking environment is described. In some embodiments, a packet is accessed, and processed using a packet processing pipeline of a service engine in a distributed network service platform, including: reaching a pre-specified point in the packet processing pipeline; inserting, in the packet processing pipeline, script code that corresponds to the pre-specified point; executing the script code to collect at least metric-related data associated with a user-specified metric object; and executing remaining packet processing pipeline.

Figure 1:
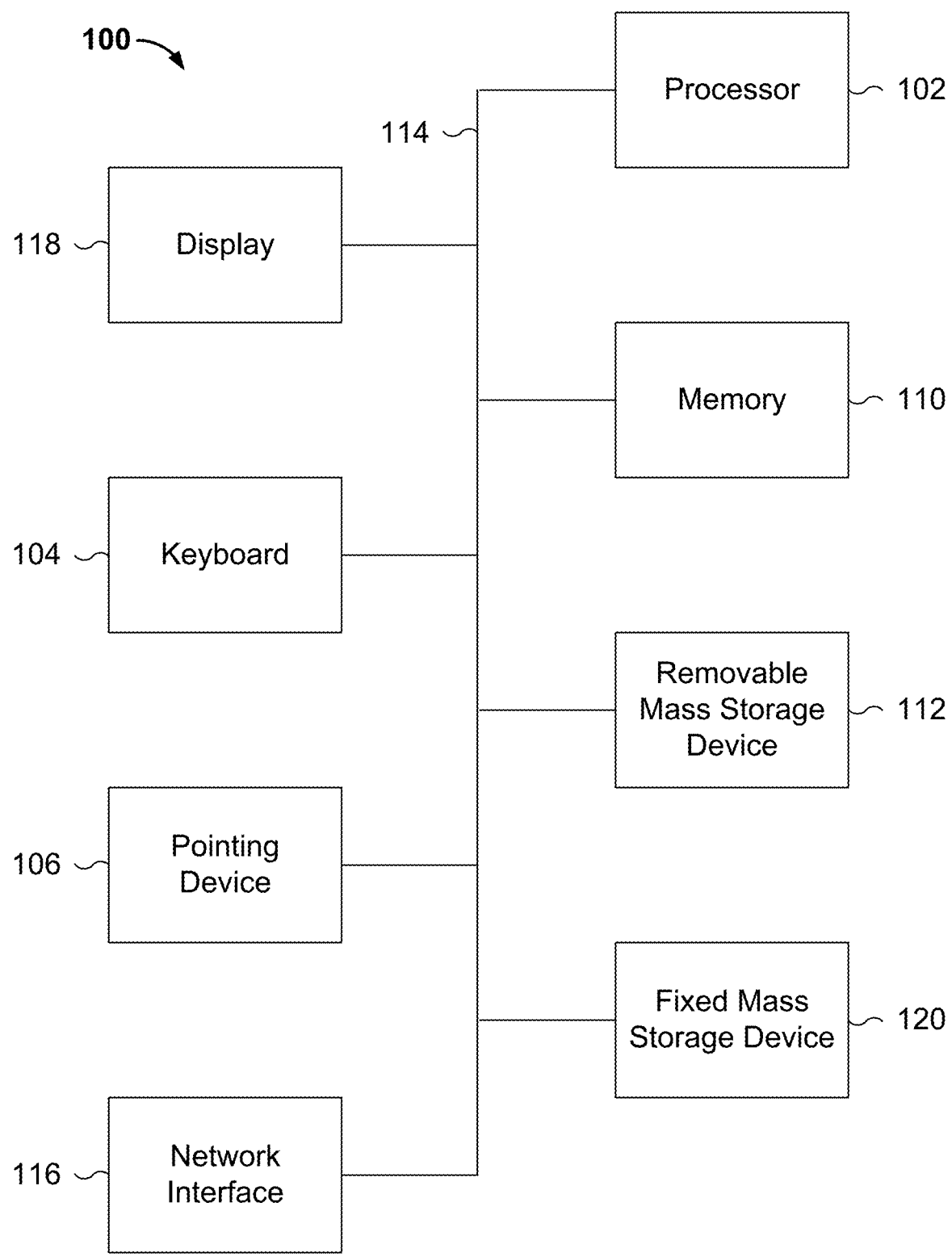
FIG. 1 is a functional diagram illustrating a programmed computer system for handling custom metrics in accordance with some embodiments.

FIG. 1 is a functional diagram illustrating a programmed computer system for handling custom metrics in accordance with some embodiments. As will be apparent, other computer system architectures and configurations can be used to collect custom metrics. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide functions described below with respect to server 202, etc. of FIG. 2.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
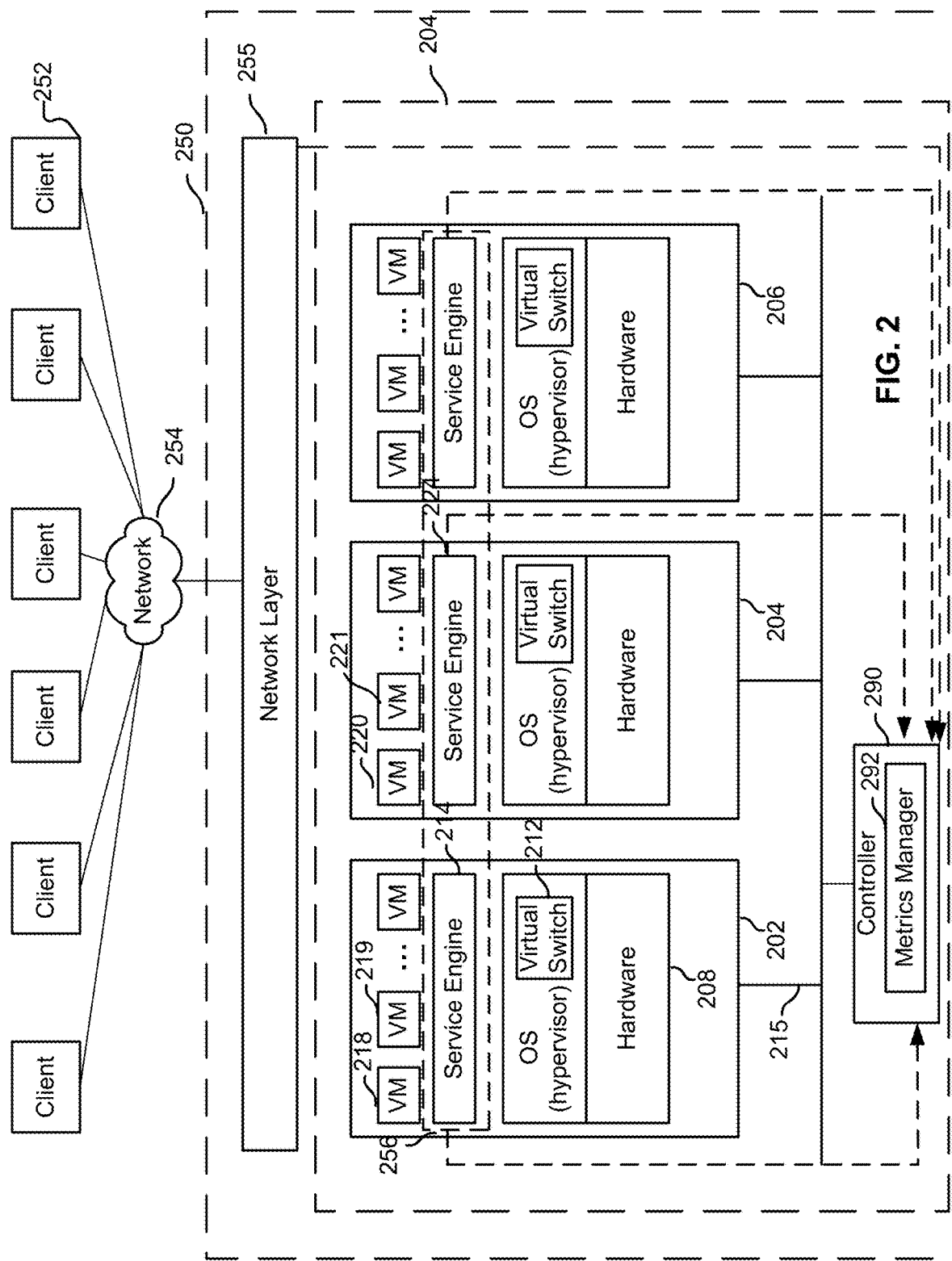
FIG. 2 is a block diagram illustrating an embodiment of a data center that includes a distributed network service platform.

FIG. 2 is a block diagram illustrating an embodiment of a data center that includes a distributed network service platform. In this example, client devices such as 252 connect to a data center 250 via a network 254. A client device can be a laptop computer, a desktop computer, a tablet, a mobile device, a smart phone, a wearable networking device, or any other appropriate computing device. In some embodiments, a web browser and/or a standalone client application is installed at each client, enabling a user to use the client device to access certain applications hosted by data center 250. Network 254 can be the Internet, a private network, a hybrid network, or any other communications network.

In the example shown, a networking layer 255 comprising networking devices such as routers, switches, etc. forwards requests from client devices 252 to a distributed network service platform 204. In this example, distributed network service platform 204 includes a number of servers configured to provide a distributed network service. A physical server (e.g., 202, 204, 206, etc.) has hardware components and software components, and can be implemented using a device such as 100. In this example, hardware (e.g., 208) of the server supports operating system software in which a number of virtual machines (VMs) (e.g., 218, 219, 220, etc.) are configured to execute. A VM is a software implementation of a machine (e.g., a computer) that simulates the way a physical machine executes programs. The part of the server's operating system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®. Although physical servers supporting VM architecture are shown and discussed extensively for purposes of example, physical servers supporting other architectures such as container-based architecture (e.g., Kubernetes®, Docker®, Mesos®), standard operating systems, etc., can also be used and techniques described herein are also applicable. In a container-based architecture, for example, the applications are executed in special containers rather than virtual machines.

In some embodiments, instances of applications are configured to execute on the VMs. In some embodiments, a single application corresponds to a single virtual service. Examples of such virtual services include web applications such as shopping cart, user authentication, credit card authentication, email, file sharing, virtual desktops, voice/video streaming, online collaboration, and many others. In some embodiments, a set of applications is collectively referred to as a virtual service. For example, a web merchant can offer shopping cart, user authentication, credit card authentication, product recommendation, and a variety of other applications in a virtual service. Multiple instances of the same virtual service can be instantiated on different devices. For example, the same shopping virtual service can be instantiated on VM 218 and VM 220. The actual distribution of the virtual services depends on system configuration, run-time conditions, etc. Running multiple instances of the virtual service on separate VMs provide better reliability and more efficient use of system resources.

One or more service engines (e.g., 214, 224, etc.) are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components. For example, a load balancer component is executed to provide load balancing logic to distribute traffic load amongst instances of applications executing on the local physical device as well as other physical devices; a firewall component is executed to provide firewall logic to instances of the applications on various devices; a metrics agent component is executed to gather metrics associated with traffic, performance, etc. associated with the instances of the applications, etc. Many other service components may be implemented and enabled as appropriate. When a specific service is desired, a corresponding service component is configured and invoked by the service engine to execute in a VM. In some embodiments, the service engine also implements a packet processing pipeline that processes packets between the clients and the virtual services. Details of the packet processing pipeline are described below.

In the example shown, traffic received on a physical port of a server (e.g., a communications interface such as Ethernet port 215) is sent to a virtual switch (e.g., 212). In some embodiments, the virtual switch is configured to use an API provided by the hypervisor to intercept incoming traffic designated for the application(s) in an inline mode, and send the traffic to an appropriate service engine. In inline mode, packets are forwarded on without being replicated. As shown, the virtual switch passes the traffic to a service engine in the distributed network service layer (e.g., the service engine on the same physical device), which transforms the packets if needed and redirects the packets to the appropriate application. The service engine, based on factors such as configured rules and operating conditions, redirects the traffic to an appropriate application executing in a VM on a server.

Controller 290 is configured to control, monitor, program, and/or provision the distributed network services and virtual machines. In particular, the controller includes a metrics manager 292 configured to collect traffic-related metrics and perform analytical operations. In some embodiments, the controller also performs anomaly detection based on the metrics analysis. The controller can be implemented as software, hardware, firmware, or any combination thereof. In some embodiments, the controller is implemented on a system such as 100. In some cases, the controller is implemented as a single entity logically, but multiple instances of the controller are installed and executed on multiple physical devices to provide high availability and increased capacity. In embodiments implementing multiple controllers, known techniques such as those used in distributed databases are applied to synchronize and maintain coherency of data among the controller instances.

In this example, user-specified metrics are configured and collected by the service engines. As will be described in greater detail below, a service engine collects user-specified metrics that correspond to respective virtual services, using its packet processing pipeline. The metrics data is sent to controller 290 to be aggregated, fed back to the service engines and/or output to a requesting application.

Within data center 250, one or more controllers 290 gather metrics data from various nodes operating in the data center. As used herein, a node refers to a computing element that is a source of metrics information. Examples of nodes include virtual machines, networking devices, service engines, or any other appropriate elements within the data center.

Many different types of metrics can be collected by the controller. For example, since traffic (e.g., hypertext transfer protocol (HTTP) connection requests and responses, etc.) to and from an application will pass through a corresponding service engine, metrics relating to the performance of the application and/or the VM executing the application can be directly collected by the corresponding service engine. Additionally, infrastructure metrics relating to the performance of other components of the service platform (e.g., metrics relating to the networking devices, metrics relating to the performance of the service engines themselves, metrics relating to the host devices such as data storage as well as operating system performance, etc.) can be collected by the controller. Specific examples of the metrics include round trip time, latency, bandwidth, number of connections, etc.

The components and arrangement of distributed network service platform 204 described above are for purposes of illustration only. The technique described herein is applicable to network service platforms having different components and/or arrangements.

Figure 3A:
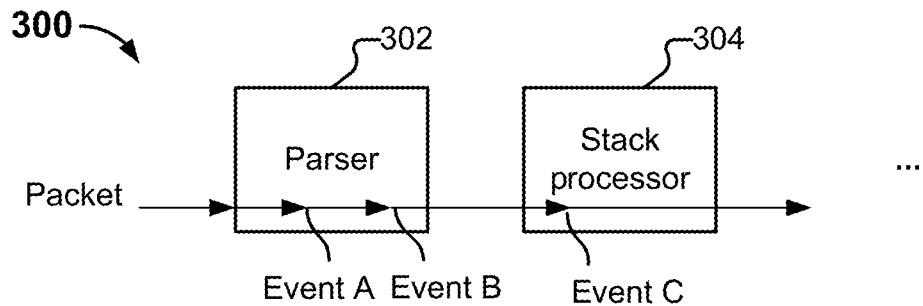
FIGS. 3A-3B are block diagrams illustrating an embodiment of a packet processing pipeline.
Figure 3B:
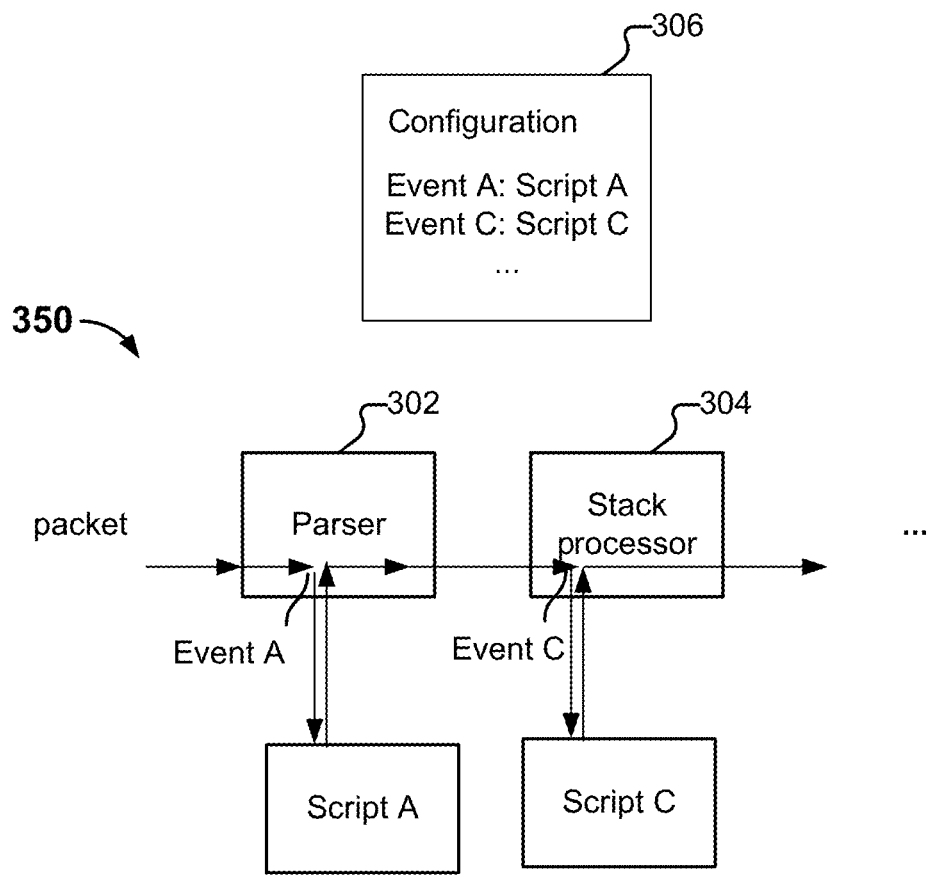

FIGS. 3A-3B are block diagrams illustrating an embodiment of a packet processing pipeline. Packet processing pipelines 300 and 350 can be implemented as a part of the service engine (e.g., 214 or 224 of FIG. 2) which runs on one or more virtual machines within a server. A service engine can include multiple packet processing pipelines. For example, a first packet processing pipeline is used to process packets that are sent by a client to a virtual service, and a second packet pipeline is used to process packets sent by a virtual service to a client. Packet processing pipelines 300 and 350 can be used to implement either the first or the second pipeline to intercept the packet and perform processing operations on it. Packet processing pipelines 300 and 350 can be implemented in software code executing on a general-purpose processor or a virtual machine, in special-purpose hardware such as FPGAs or ASICs, and/or other appropriate software/hardware combination.

The packet processing pipeline typically includes multiple stages. FIG. 3A illustrates a normal processing pipeline example without customization. In this example, packet processing pipeline 300 includes a parser 302 and a stack processor 304. Parser 302 parses the packet that is to be processed by the pipeline. In some embodiments, a parser library is used to implement the parser. For example, if the packet is an HTTP packet, the header information and key-value pairs included in the packet are extracted by the parser according to standard protocol format. Other packet format can also be parsed. Stack processor 304 performs stack processing on the TCP/IP stack, such as packet header inspection, packet payload inspection, load balancing, firewall, etc. Other/additional stages can be included in other embodiments.

The functions in the pipeline are marked according to certain pre-specified points. In this example, the pre-specified points correspond to events that occurred during packet processing, such as completing the parsing of an HTTP request headers, completing the parsing of a DNS request, receiving data from the back end server, etc. These points serve as hooks for inserting user-specified script code. When no special user configuration is present, pipeline 300 processes packets normally.

FIG. 3B illustrates a modified processing pipeline with user customization. In this example, a user-specified configuration file 306 is provided to form a reconfigured pipeline 350. In the configuration file, among other things, certain events are mapped to corresponding scripts. For example, Event A corresponds to Script A, Event C corresponds to Script C, etc. Thus, during the processing of a packet using the reconfigured pipeline, when Event A is detected (e.g., a parsing function associated with Event A finishes processing an HTTP packet header), Script A is inserted into the pipeline and invoked; when Event C is detected, Script C is inserted into the pipeline and invoked, etc. Note that an event is not required to have a corresponding script. For example, Event B is not configured with a corresponding script and when it is triggered the pipeline performs its processing normally.

The following is an example list of pre-specified events. Other events can be specified in different embodiments.

```
enum
VSDataScriptEvent
{
    VS_DATASCRIPT_EVTH_HTTP_REQ = 0 [
        (e_description) = "Event triggers when the client side http "
        "request headers are fully parsed"
    ];
    VS_DATASCRIPT_EVTH_HTTP_RESP = 1 [
        (e_description) = "Event triggers when the server side http "
        "response status and headers are fully parsed"
    ];
    VS_DATASCRIPT_EVTH_HTTP_RESP_DATA = 2 [
        (e_description) = "Event triggers when data is received in the"
        "http response from the backend server"
    ];
    VS_DATASCRIPT_EVT_HTTP_LB_FAILED = 3 [
        (e_description) = "Event triggers when server selection for"
        "load balancing the HTTP request fails"
    ];
    VS_DATASCRIPT_EVT_HTTP_REQ_DATA = 4 [
        (e_description) = "Event triggers when the client side http "
        "request data is fully received"
    ];
    VS_DATASCRIPT_EVT_HTTP_RESP_FAILED = 5 [
        (e_description) = "Event triggers when http response from"
        "backend server fails"
    ];
    /* reserve upto 20 events for L7 */
    VS_DATASCRIPT_EVT_TCP_CLIENT_ACCEPT = 21 [
        (e_description) = "Event triggers when TCP client connection is
accepted"
    ];
    VS_DATASCRIPT_EVT_DNS_REQ = 36 [
        (e_description) = "Event triggers when DNS request received from"
        "the client is parsed successfully"
    ];
    VS_DATASCRIPT_EVT_DNS_RESP = 37 [
        (e_description) = "Event triggers when DNS response is received from"
        "an upstream load balanced DNS server"
    ];
    VS_DATASCRIPT_EVT_MAX = 50;
}
```

A user or administrator can use an editor to create or modify a configuration file, which specifies, among other things, objects such as virtual services, script sets, etc. APIs associated with the objects are provided to support the creation and operations of the objects. For example, a script set can define script code that is invoked when a particular event is triggered. The script set can include logic operations (e.g., determine whether certain conditions are met) and obtain associated metrics information. Additional operations such as outputting the data can also be performed. The configuration file includes such API calls.

In some embodiments, custom metrics APIs that create and maintain metric objects such as counters, status variables, etc. are implemented and provided for the user to incorporation into the script. For example, avi.vs.analytics-.counter provides the following API call:

function avi.vs.analytics.counter (counter-name, operation, value) return value

In this function, "counter-name" is the identifier for the counter object. If the counter object does not already exist, the API will create a counter object with counter-name and initialize its default value to 0. "Operation" specifies the type of operation to be performed on the counter, such as incrementing the counter value, reading the counter value, etc. "Value" is an optional parameter that specifies the steps size for incrementing the counter value; omitting this parameter will set the default steps size to 1. Thus, the first call using the API, avi.vs.analytics.counter ("Foo", USERDEFINED COUNTER OP INCREMENT, 42) will create a counter named "Foo", set its value to 42, and return the value of 42. The next call using the API, avi.vs.analytics.counter ("Foo", USERDEFINED COUNTER OP INCREMENT) will increment the counter by 1 and return the value of 43. Many other APIs are implemented in various embodiments to support gathering metrics information.

The script object specifies the event and corresponding script that is executed when the event is detected. For example, in the following configuration file, when an event VS_DATASCRIPT_EVT_HTTP_REQ (i.e., client side HTTP Request headers are fully parsed for a packet) is detected, script code is invoked. In this example, the script code is in DataScript™, which is a Lua™-based scripting language and environment. The script collects metrics data by using custom metrics API calls. In particular, the script makes an API call (avi.http.getpath) that gets the path in the request, determines whether the path string matches a counter name, and if so, makes another API call (avi.vs.analytics.absolute) to get the counter value for counter named "counter_1". The counter value is returned in an HTTP response via another API call (avi.http.response). The script execution environment provides the mechanisms to locate the entry points for API calls, manage memory, perform operations, as well as connecting the script code/API calls to the packet processing pipeline code.

```
vsdatascriptset_object {
    uuid: "vsds1-1"
    name: "vsds1-1"
```

```
datascript {
  evt: VS_DATASCRIPT_EVT_HTTP_REQ
  script: "local path=avi.http.get_path( ) \n local val=0 \n \n
    if path==\"/get_counter_name_1\" then \n avi.vs.ana-
    lytics.absolute(\"counter_1\") \n return avi.http.re-
    sponse(200, {content type=\"text/html\"}, val) \n end"
  }
}
```

Figure 4:
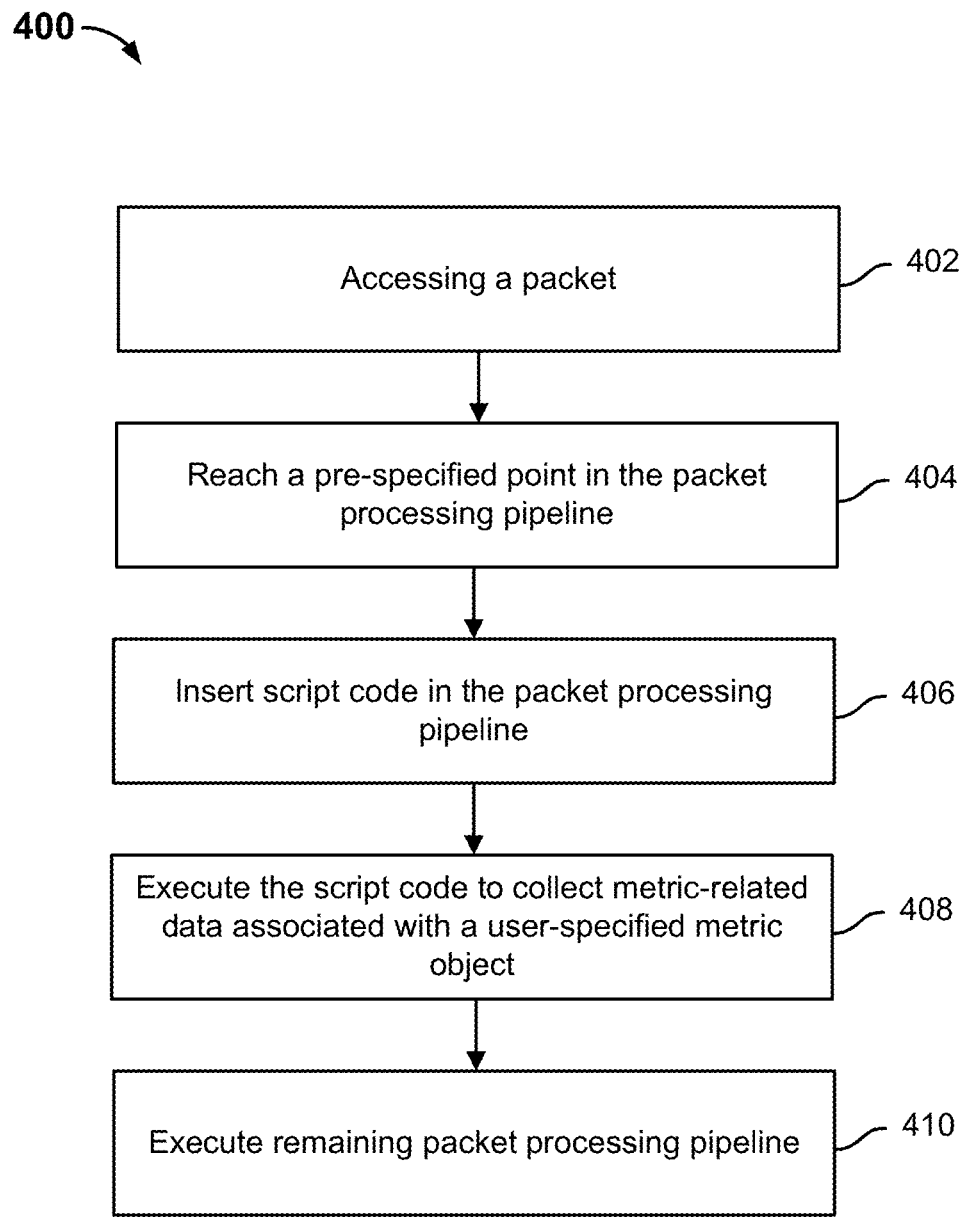
FIG. 4 is a flowchart illustrating an embodiment of a process for collecting custom metrics.

FIG. 4 is a flowchart illustrating an embodiment of a process for collecting custom metrics. Process 400 can be implemented on a system such as 100. Process 400 can also be implemented on a service engine such as 214 of FIG. 2. Process 400 collects metrics of packets at line rate, as traffic is received and processed.

At 402, a packet is accessed. The packet can be a packet that is received from a client and to be forwarded by the service engine to a destination virtual service. The packet can also be a packet that is transmitted by a virtual service and to be forwarded by the service engine to a client. In both cases, the packet is intercepted and processed by the service engine before being forwarded to its destination.

The packet is processed using the packet processing pipeline in the service engine. In this example, a packet processing pipeline with the custom configuration such as 350 is used. At 404, a pre-specified point in the packet processing pipeline is reached. Specifically, an event is detected. Such an event can be any event enumerated in the VSDataScriptEvent example above.

At 406, in response to the pre-specified event being detected, script code that corresponds to the pre-specified event is inserted into the pipeline. In particular, the script code includes API calls to access user-specified metric objects such as counters, status variables (e.g., measurements), etc. The APIs will create and initialize the metric objects as needed. In some embodiments, the insertion includes pointing to the address of the script code.

At 408, the script code is executed to collect metric-related data associated with one or more user-specified metric object. According to the script, metrics related operations (including logic operations) are performed. In some instances the operations are performed using API calls as described above. For example, an API can be invoked for a counter object that counts the number of HTTP requests with a particular path can be updated, and returns the counter value; another API can be invoked for a status object such as percentage of CPU usage to take the measurement and return the measurement value, etc.

At 410, the process returns to the packet processing pipeline to continue executing the remaining portion of the pipeline. In particular, the process returns to the point in the pipeline where the script code was inserted.

Process 402-410 can be repeated for multiple packets.

In some embodiments, a custom metric object such as a counter, a measurement, etc. includes a timestamp used to facilitate garbage collection. The timestamp is created when the object is created, and updated each time the object is accessed. A garbage collector is periodically invoked by the service engine to check the custom metric objects to identify the ones that have not been used for a at least pre-specified amount of time (e.g., at least two hours), and automatically destroying the older objects to free up memory.

In some embodiments, the collected metric-related data is sent to a controller of the distributed network service platform, to be aggregated and outputted as appropriate. The metrics data can be sent as it is collected, or sent in batches periodically. In some embodiments, the metric-related data is formatted and sent to the controller according to a pre-established service engine-controller communication protocol.

Figure 5:
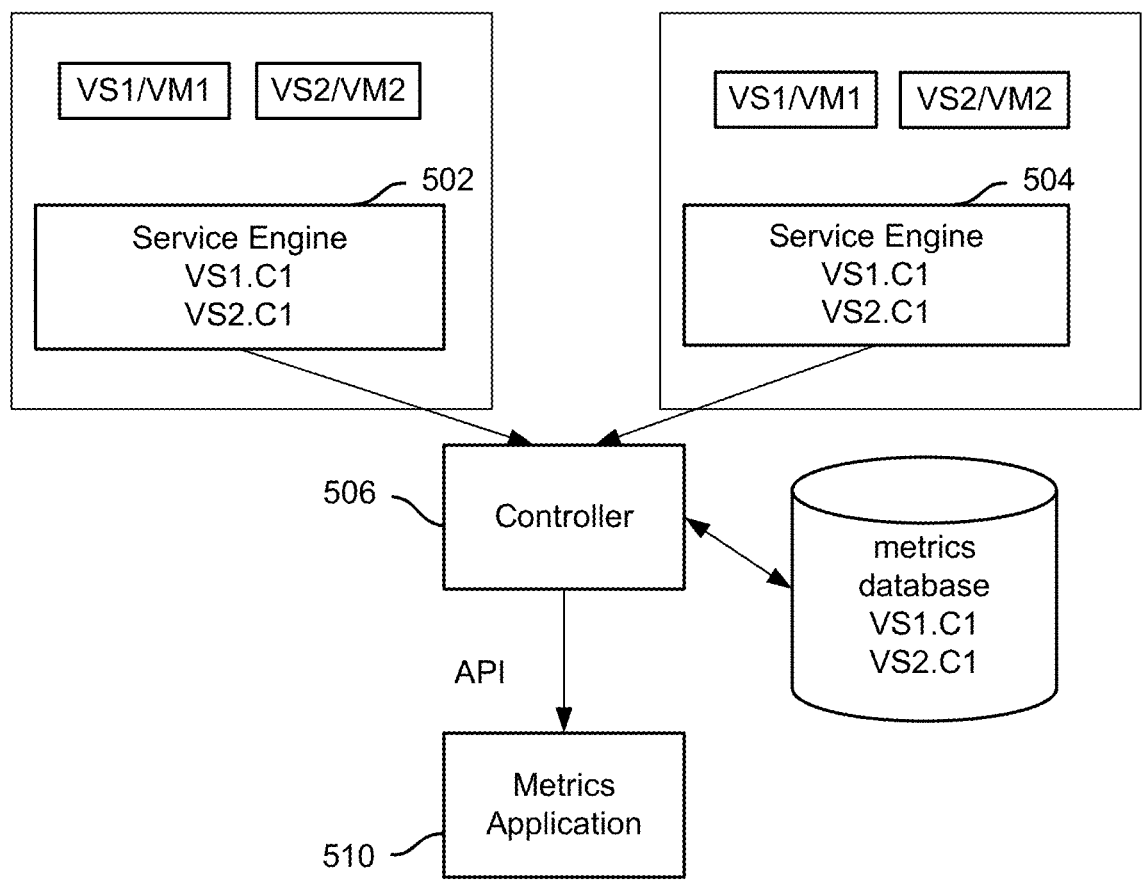
FIG. 5 is a diagram illustrating a controller and service engines configured to collect metrics according to an embodiment of the invention.

FIG. 5 is a diagram illustrating a controller and service engines configured to collect metrics according to an embodiment of the invention.

In this example, service engine 502 and 504 are on separate devices. The service engines are configured to collect metrics data for virtual services running on the respective devices, and send the collected data to controller 506. Each service engine is configured to collect metrics data associated with a counter named C1. The counters, however, have different associated contexts which relate to different virtual services. This is because the same script set object can be used by multiple virtual services according to the configuration file. For example, the configuration file can specify that virtual service VS1 includes a counter object C1, and virtual service VS2 also includes C1. Since the counter objects C1s have different contexts, they are considered to be separate objects, and the collected values are stored separately in the controller's database to allow context-specific queries (e.g., the total number of packets for VS1 and the total number of packets for VS2.

In some embodiments, the metrics are output to the service engine, according to the format of an existing protocol between the service engine and the controller. For example, the script executed by the service engine may require the service engine to check the sum for a counter across all the service engines, and send an alert if the sum exceeds a certain threshold. Thus, the service engine queries the controller (periodically or as needed) to obtain the sum of the counter.

In some cases, the metrics are output in response to a query. For example, a user can make a query to the controller to obtain data pertaining to a counter, such as the sum, the average, the maximum, the minimum, etc. The query can be made via a metrics application 510 that provides a user interface configured to invoke a metrics API. The metrics application can be implemented as a browser-based application or a standalone application. In response, the controller determines the query result based on the values in the database and returns the query result to the user. A pre-defined metrics API is used to perform the query and obtain a response.

In some embodiments, the API functions are implemented using Representation State Transfer (REST) APIs, which is an HTTP-based API architecture. The user can invoke the APIs via a metrics application (which can be a web browser or other user interface application). The API calls are in the form of HTTP requests to the controller. The controller, which runs as a web server, response to the request by invoking an appropriate function to obtain the requested data and send the result back in an HTTP response. The response can be stored, displayed, or otherwise output to the metrics application. In one example, the API has the following format:

http://<controller-ip>/api/analytics/metrics/virtualservice/<vs_uuid>?metric_id=<metric_id>&obj_id=<obj_id>&step=<step>&limit=<limit> where controller-ip is the IP address of the controller; <vs_uuid> is the identifier of the virtual service and if omitted, all matching objects are returned; metric_id is the identifier for the type of the metric data (e.g., sum, average, minimum, maximum, etc.); obj_id is the identifier of the metric object (e.g., counter name); step is the granularity of the data to be obtained (e.g., at 5-second interval or 5-minute interval), and limit is the number of values to be obtained.

For purposes of illustration, the following specific APIs for four types of metric data are described, although other APIs for accessing metrics data can also be implemented:

user.sum_counter: this is an aggregated counter value in a given time period across all service engines. For example, to obtain the latest 5-minute (300 seconds) sample of aggregated counter value for a counter with the identifier of "Foo", the following API call is used:

http://<controller-ip>/api/analytics/metrics/virtualservice/<vs_uuid>?metric_id=user.sum_counter&obj_id=Foo&step=300&limit=1 user.avg_counter: this is an average rate of the counter value with respect to time. For example, to obtain the latest 5-minute sample of the average rate of counter Foo per second, the following API call is used:

http://<controller-ip>/api/analytics/metrics/virtualservice/
<vs_uuid>?metric_id=user.avg_counter&obj_id=Foo&step=300&limit=1 user.max_counter and user.min_counter: These counter values represent the maximum and minimum counter values for a given time period. For example, to obtain the maximum and minimum values of counter Foo for the latest 5-minute interval, the following APIs calls are used:

http://<controller-ip>/api/analytics/metrics/virtualservice/
<vs_uuid>?metric_id=user.max_counter&obj_id=Foo&step=300&limit=1
http://<controller-ip>/api/analytics/metrics/virtualservice/<vs_uuid>?metric_id=user.min_counter&obj_id=Foo&step=300&limit=1

In response to the API request, the controller locates the appropriate object, computes the value, and returns the data in a REST API-based response. FIG. 6 illustrates an example response from the controller which returns the values of an average for two time periods.

Figure 7:
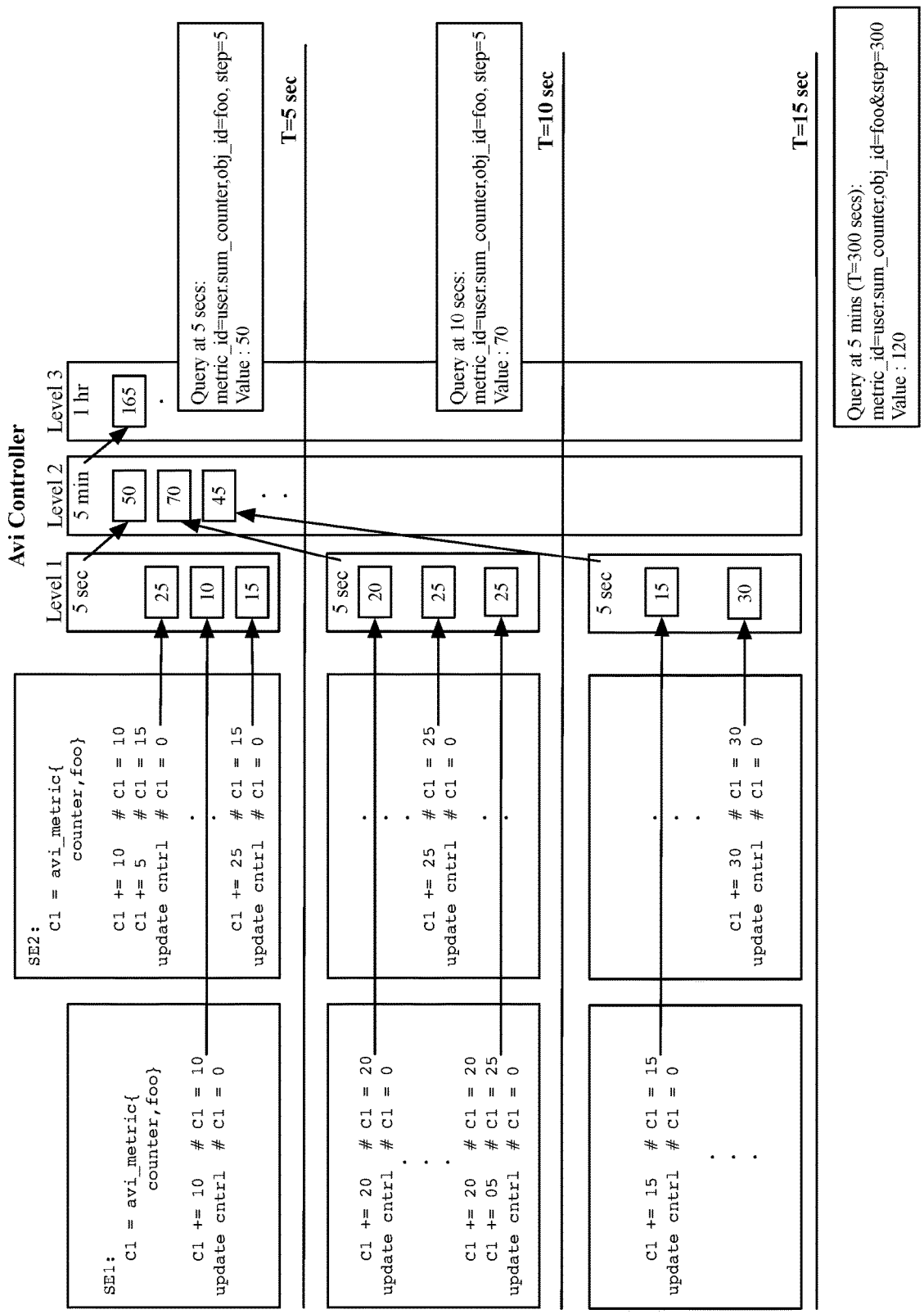
FIG. 7 is a diagram illustrating an aggregation example.

In some embodiments, the controller implements multiple levels of aggregated storage based on a time-series database. FIG. 7 is a diagram illustrating an aggregation example. In this example, two service engines SE1 and SE2 are both updating a counter C1. The counter values are sent to the controller as soon as an update function is called. In the level 1, the counter values are updated every second and aggregated every 5 seconds to generate data sample points for level 2. In level 2, the data sample points are aggregated every 5 minutes to generate data sample points for level 3. Additional levels and levels with different aggregation intervals can be used. Depending on the requested granularity, data from the appropriate level is obtained. For example, in a request that has a fine granularity (e.g., step=5), the values stored in the first level are returned; in a request that has a higher granularity (e.g., step=300), the values stored in the second levels are returned, etc.

Providing custom metrics in a distributed network service platform has been disclosed. The use of configuration file with script to handle custom metrics is highly flexible and allows custom metrics to be created and managed easily, without having to recompile service engine code. Further, the technique is highly scalable. For example, when a service engine and its associated virtual services have exceeded capacity and a new service engine and virtual services are launched, the new service engine can import the same configuration file and execute the same script as used by the existing service engine, such that counters for the same virtual services are created and handled in the same way.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing a distributed network service that is performed for a distributed application that comprises a plurality of application instances executing on a plurality of host computers, the method comprising:
   at a service engine executing on a particular host computer in the plurality of host computers that performs a service on packets addressed to an application instance executing on the particular host computer:
      receiving a packet destined for the application instance executing on the particular host computer;
      processing the packet through a first portion of a packet processing pipeline of the service engine as part of performing the service on the packet until reaching a particular point in the packet processing pipeline;
      after reaching the particular point, invoking a user-defined script that a user associated with the particular point to collect metric data associated with the packet processing at the particular point in the packet processing pipeline;
      processing the packet through the remaining portion of the packet processing pipeline to complete the service performed on the packet, wherein the service performed on the packet comprises at least one of modifying the packet and determining whether to drop or allow the packet; and
      sending the script-collected metric data to a controller to be aggregated with script-collected metrics collected by a set of service engines executing on a corresponding set of host computers.

2. The method of claim 1, wherein aggregated script-collected metric data is output for display on an output device.

3. The method of claim 2, wherein the script-collected metric data is sent to the controller periodically.

4. The method of claim 1 further comprising receiving aggregated script-collected metrics from the controller to update a set of operating conditions used to perform the service.

5. The method of claim 1, wherein the metric data associated with the particular point is related to at least one of a user-specified counter and a user-specified status variable.

6. The method of claim 1, wherein the particular point is an event that is one of completing the parsing of an HTTP request header, completing the parsing of a DNS request, and receiving data from a back end server, and the script-collected metric is a path string associated with the event.

7. The method of claim 1, wherein the user-defined script includes a DataScript™ script.

8. The method of claim 1, wherein invoking the user-defined script comprises executing an application programming interface (API) call associated with the script-collected metric data, wherein the API call is included in a configuration file of the service engine.

9. The method of claim 1, wherein the script-collected metric data comprises an association with a particular application instance served by the service engine.

10. A non-transitory machine readable medium storing a program for execution by a set of processing units, the program for managing a distributed network service that is performed for a distributed application that comprises a plurality of application instances executing on a plurality of host computers, the program comprising sets of instructions for:
- at a service engine executing on a particular host computer in the plurality of host computers that performs a service on packets addressed to an application instance executing on the particular host computer:
  - receiving a packet destined for the application instance executing on the particular host computer;
  - processing the packet through a first portion of a packet processing pipeline of the service engine as part of performing the service on the packet until reaching a particular point in the packet processing pipeline;
  - after reaching the particular point, invoking a user-defined script that a user associated with the particular point to collect metric data associated with the packet processing at the particular point in the packet processing pipeline;
  - processing the packet through the remaining portion of the packet processing pipeline to complete the service performed on the packet; and
  - sending the script-collected metric data to a controller to be aggregated with script-collected metrics collected by a set of service engines executing on a corresponding set of host computers.

11. The non-transitory machine readable medium of claim 10, wherein aggregated script-collected metric data is output for display on an output device.

12. The non-transitory machine readable medium of claim 10, wherein the program further comprises a set of instructions for receiving aggregated script-collected metrics from the controller to update a set of operating conditions used to perform the service.

13. The non-transitory machine readable medium of claim 10, wherein the metric data associated with the particular point is related to at least one of a user-specified counter and a user-specified status variable.

14. The non-transitory machine readable medium of claim 10, wherein the particular point is an event that is one of completing the parsing of an HTTP request header, completing the parsing of a DNS request, and receiving data from a back end server, and the script-collected metric is a path string associated with the event.

15. The method of claim 1, wherein the particular point is a first particular point and processing the packet through the remaining portion of the packet processing pipeline comprises:
- processing the packet through a second portion of the packet processing pipeline until reaching a second particular point in the packet processing pipeline;
- after reaching the second particular point, invoking a user-defined script that the user associated with the second particular point to collect metric data associated with the packet processing at the second particular point in the packet processing pipeline; and
- processing the packet through the remaining portion of the packet processing pipeline to complete the service performed on the packet.

16. The non-transitory machine readable medium of claim 10, wherein the particular point is a first particular point and the set of instructions for processing the packet through the remaining portion of the packet processing pipeline comprises sets of instructions for:
- processing the packet through a second portion of the packet processing pipeline until reaching a second particular point in the packet processing pipeline;
- after reaching the second particular point, invoking a user-defined script that the user associated with the second particular point to collect metric data associated with the packet processing at the second particular point in the packet processing pipeline; and
- processing the packet through the remaining portion of the packet processing pipeline to complete the service performed on the packet.

17. The non-transitory machine readable medium of claim 10, wherein the set of instructions for invoking the user-defined script code comprises a set of instructions for executing an application programming interface (API) call associated with the script-collected metric data, wherein the API call is included in a configuration file of the service engine.

18. The non-transitory machine readable medium of claim 10, wherein the script-collected metric data comprises an association with a particular application instance served by the service engine.

19. The method of claim 1, wherein the service is a load balancing service and performing the service comprises modifying the packet to redirect the packet to an application instance that is not the application instance executing on the particular host computer.

20. The method of claim 1, wherein the service is a firewall service and performing the service comprises determining whether to drop or allow the packet.

* * * * *